(12) United States Patent
Arroyo Martinez

(10) Patent No.: US 10,148,856 B2
(45) Date of Patent: Dec. 4, 2018

(54) PORTABLE TELEPROMPTER EQUIPMENT

(71) Applicant: Luis Arroyo Martinez, Madrid (ES)

(72) Inventor: Luis Arroyo Martinez, Madrid (ES)

( * ) Notice: Subject to any disclaimer, the term of this patent is extended or adjusted under 35 U.S.C. 154(b) by 0 days.

(21) Appl. No.: 15/302,188

(22) PCT Filed: Apr. 1, 2015

(86) PCT No.: PCT/ES2015/070267
§ 371 (c)(1),
(2) Date: Oct. 6, 2016

(87) PCT Pub. No.: WO2015/155394
PCT Pub. Date: Oct. 15, 2015

(65) Prior Publication Data
US 2017/0034404 A1    Feb. 2, 2017

(30) Foreign Application Priority Data
Apr. 9, 2014  (ES) .................... 201430530

(51) Int. Cl.
| | |
|---|---|
| *G03B 21/58* | (2014.01) |
| *G03B 21/134* | (2006.01) |
| *H04N 5/222* | (2006.01) |
| *H04N 5/64* | (2006.01) |
| *G02B 27/14* | (2006.01) |

(Continued)

(52) U.S. Cl.
CPC ......... *H04N 5/2222* (2013.01); *G02B 27/144* (2013.01); *G03B 21/58* (2013.01); *H04N 5/28* (2013.01); *H04N 5/64* (2013.01); *H04N 7/10* (2013.01); *G03B 21/134* (2013.01)

(58) Field of Classification Search
CPC ...... G03B 21/134; G03B 21/28; G03B 21/58; H04N 5/2222; H04N 21/854; H04N 5/28; H04N 5/64; G02B 27/144
USPC ................. 352/4; 348/722; 353/122, 98, 99; 359/630
See application file for complete search history.

(56) References Cited

U.S. PATENT DOCUMENTS 5,373,333 A    12/1994  Kawada et al.
8,690,219 B1   4/2014   Calvert
(Continued)

FOREIGN PATENT DOCUMENTS

CN    201616099 U    10/2010
CN    202931450 U    5/2013
(Continued)

OTHER PUBLICATIONS

Spanish Search Report for ES 201430530 dated Jul. 1, 2015.
(Continued)

*Primary Examiner* — Ryan Howard
(74) *Attorney, Agent, or Firm* — Sughrue Mion, PLLC

(57) ABSTRACT

A portable teleprompter system, which comprises two sets of transparent reflective sheets with their respective support poles and associated displays, the system comprising a carry-on-sized suitcase that holds the system components and has two separable parts, each one of which is fit to be arranged in a stable manner on a floor, offering an upwards-facing operating face that is provided with at least means for firmly supporting a display; and means for anchoring a pole in such a position that the reflective sheet supported by said pole can reflect the content shown on the display.

22 Claims, 4 Drawing Sheets

(51) Int. Cl.
*H04N 5/28* (2006.01)
*H04N 7/10* (2006.01)

(56) References Cited

U.S. PATENT DOCUMENTS

| | | | |
|---|---|---|---|
| 2004/0085485 | A1 | 5/2004 | Schedivy |
| 2008/0204870 | A1 | 8/2008 | Choi |
| 2008/0309889 | A1* | 12/2008 | Rivera .................. G03B 21/14 353/98 |

FOREIGN PATENT DOCUMENTS

| | | |
|---|---|---|
| EP | 0 084 605 A1 | 8/1983 |
| ES | 1 029 389 U | 5/1995 |
| GB | 2 131 646 A | 6/1984 |
| GB | 2 186 385 A | 8/1987 |

OTHER PUBLICATIONS

International Search Report for PCT/ES2015/070267 dated Aug. 7, 2015.
Written Opinion for PCT/ES2015/070267 dated Aug. 7, 2015.

\* cited by examiner

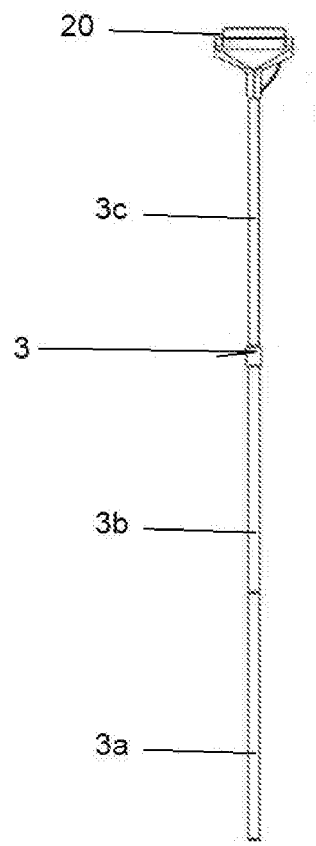
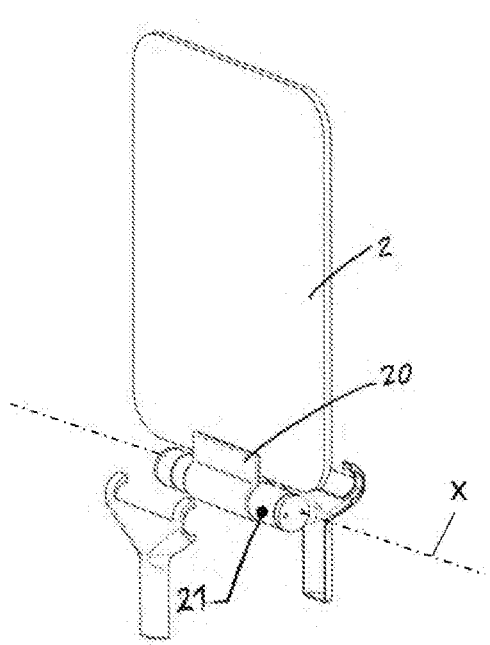
Fig. 4
Fig. 5
Fig. 6

PORTABLE TELEPROMPTER EQUIPMENT

CROSS REFERENCE TO RELATED APPLICATIONS

This application is a National Stage of International Application No. PCT/ES2015/070267 filed Apr. 1, 2015, claiming priority based on Spanish Patent Application No. 201430530 filed Apr. 9, 2014, the contents of all of which are incorporated herein by reference in their entirety.

APPLICATION FIELD OF THE INVENTION

The invention relates to a portable teleprompter system, in particular to a podium or speech teleprompter system.

BACKGROUND OF THE INVENTION

The teleprompter is an electronic apparatus that reflects a text, which has previously been loaded on a computer and shown on a display, onto a transparent sheet of glass situated in the field of vision of a speaker at a distance that allows it to be read, such that they may look straight ahead or to the sides while reading the text, so that their diction is more natural. Podium or speech teleprompters, also referred to as presidential teleprompters, are the sort used for events in which a speaker is located in front of an audience.

In their present form, speech teleprompters are often rented by the day to be used during important lectures or major speeches. When they are rented out, it is common for the service to include an assisting operator who assists during installation and who may optionally guide the text remotely from a computer.

Assistance for installation is required because known teleprompters incorporate two reflective mirrors and the necessary system for showing the text that is to be reflected, which includes two monitors weighing a total of approximately 70 kg, including the carrying case or cases, and employ at least six cables. Two connect each of the two monitors to the power supply; another two connect each of the two monitors to a VGA signal splitter; one connects the VGA signal splitter to the power supply; and another connects the VGA signal splitter to the computer providing the text.

On stage, it is common and advisable to hide or conceal the cables as much as possible, as well as the two monitors, so that the audience does not see the text scrolling across their screens, which would be the case if the two monitors were not covered on at least three sides by a sufficiently tall cover/hood. Moreover, in addition to the components that the teleprompter needs in order to operate, the question of how to hide the monitors must be resolved on a case-by-case basis, and without getting in the way of them carrying out their function or of the displayed image being reflected onto the associated sheets of glass.

The result is that, in its current conception, the great majority of speakers and lecturers do not find the speech teleprompter comfortable. They see it as an apparatus that is too complex to set up, too complicated to use, hard to camouflage on stage (due both to its cables and to its monitors), expensive to buy or to rent, too heavy to carry and, in a word, only to be used on very special occasions by high-level speakers or lecturers surrounded by significant human teams, for example heads of state, cabinet ministers, lecturers at major events being broadcast in the media, and on solemn occasions, permitting longer and more specific setup.

Therefore, one aim of the present invention is a teleprompter system that can overcome these drawbacks.

As such, it should be noted that there is currently a need for a teleprompter system that can match the features of existing speech teleprompters, but which is easier to install and to carry.

Another aim is for the proposed teleprompter system to enable solutions to be incorporated which dispense with the need for an assistant, and not just for carrying and installing the system, but even for tasks such as positioning the mirrors during a speech.

The teleprompter system of the present invention is intended to make the speech teleprompter available to the general public, making it accessible to everyone since its features make it suitable for distribution and marketing through the channels of personal and home electronics consumption, such as department stores, electronics stores, etc., as opposed to just specialized channels.

DESCRIPTION OF THE INVENTION

The invented teleprompter system comprises two sets of transparent reflective sheets with their respective support poles and associated displays. Essentially the teleprompter system is characterized in that it comprises a carry-on-sized suitcase that holds the system components and has two separable parts, each one of which is configured to be arranged in a stable manner on a floor, offering an upwards-facing operating face that is provided with at least means for firmly supporting a display; and means for anchoring a pole in such a position that the reflective sheet supported by said pole can reflect the content shown on the display.

Advantageously, the same element that is used to carry the system ensures that the poles are adjusted properly, and acts as a hood to conceal the displays from the public.

In one variant, the means for firmly supporting the display are formed by a window or a recess made in the operating face of the corresponding part of the suitcase, in which the display is secured.

According to one embodiment, the operating faces of the parts of the suitcase are equipped with a series of housings designed to house the reflective sheets and the associated poles, said housings serving as a repository for these components while the system is being carried inside the suitcase. This ensures that the system is handled properly while it is being stored and carried.

Preferably, the operating face of the two parts of the suitcase comprises a first housing whose dimensions allow at least one reflective sheet of the system to fit snugly inside of it.

It is provided that the operating face of the two parts of the suitcase shall comprise a second housing into which a pole of the system is meant to fit snugly when in a folded position.

According to one embodiment, the second housing is formed by a series of recesses arranged around the edge of the window or recess and of the first housing, such that the pole of the system is placed directly over the display and the reflective sheet while carrying the system inside the suitcase.

According to another aspect of the invention, the two parts of the suitcase define a mutual coupling plane, and the display, the reflective sheet and, where appropriate, the pole, are sunken below the coupling plane in each part of the suitcase when the latter acts as a repository.

It is of interest that the coupling plane is an inclined plane, there being in each part of the suitcase a deeper area in which the display is located, and a shallower area fit to house the reflective sheets.

In a form that is of interest, the poles are folding poles and comprise various sections concatenated together by means of elastic means that respond to stress, such that they tend to arrange the coupled sections in a line, thus forming a rigid rod, but which give the pole the ability to fold against itself between every two consecutive sections through the deformation of the elastic means.

According to another feature of the invention, the pole-anchoring means comprise a hole in the operating face of each part of the suitcase, into which the bottom end of a pole is inserted.

These pole-anchoring means may further comprise motorized means fit to transmit a rotational movement to said pole around its longitudinal axis.

In one example, the motorized means comprise a socket, mounted so as to rotate in the corresponding part of the suitcase and with suitable dimensions for the bottom end of the pole to be inserted therein, a motor with an output shaft normal to the axis of the socket and gears for transmitting the rotational movement of the motor shaft to the socket.

The motorized means are preferably arranged in the deeper portion of each part of the suitcase.

In accordance with another aspect of the invention, one end of each pole may be equipped with means to detachably couple to a corresponding reflective sheet.

These detachable coupling means may be connected to second motorized means that give it the ability to rotate around an axis (x) normal to the pole and therefore to fold down the coupled reflective sheet.

The parts of the suitcase are provided with means to wirelessly transmit a video signal between them, to connect a video cable between the two parts of the suitcase, or both at once.

The reflective sheets are preferably made of acrylic glass and the system comprises a first and a second set of reflective sheets, the reflective sheets of one of the sets being tinted.

BRIEF DESCRIPTION OF THE DRAWINGS

FIG. 4 shows a pole in a folded position;

FIG. 5 is a detail of the coupling area between a pole and a reflective sheet, shown in their relative assembly position;

FIG. 6 is a cross-sectional view of the elements of FIG. 5 when assembled; and

DETAILED DESCRIPTION OF THE INVENTION

Figure 1:
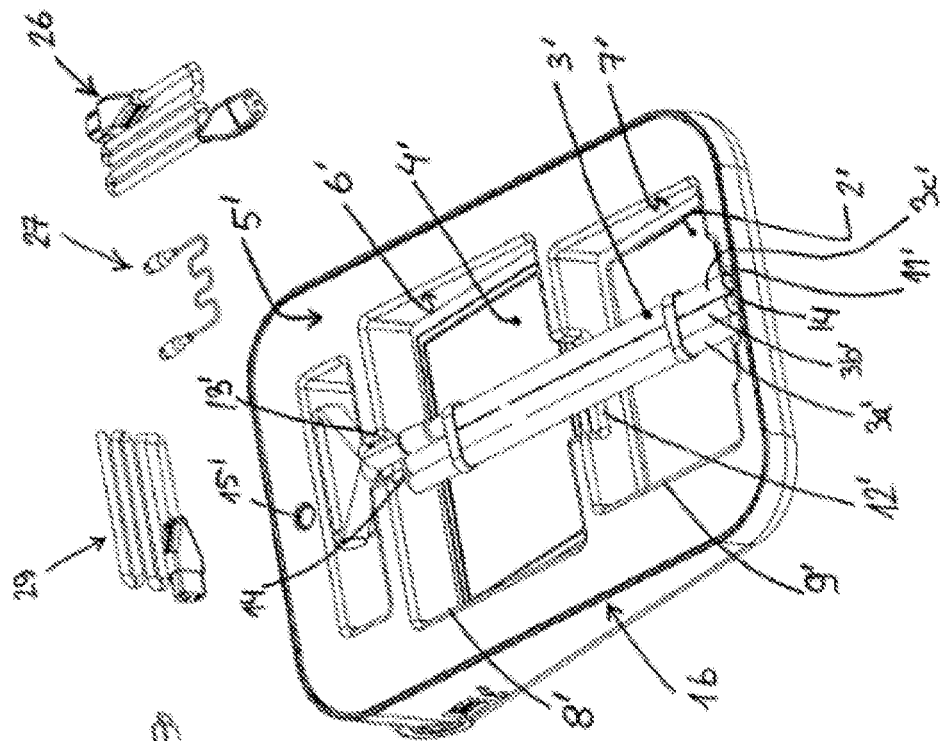
FIG. 1 illustrates a teleprompter system according to the invention, specifically wherein the two parts of the suitcase that characterize it are separated, so as to be able to show the components of the system conveniently organized in order to be housed in each part of the suitcase.
Figure 1:
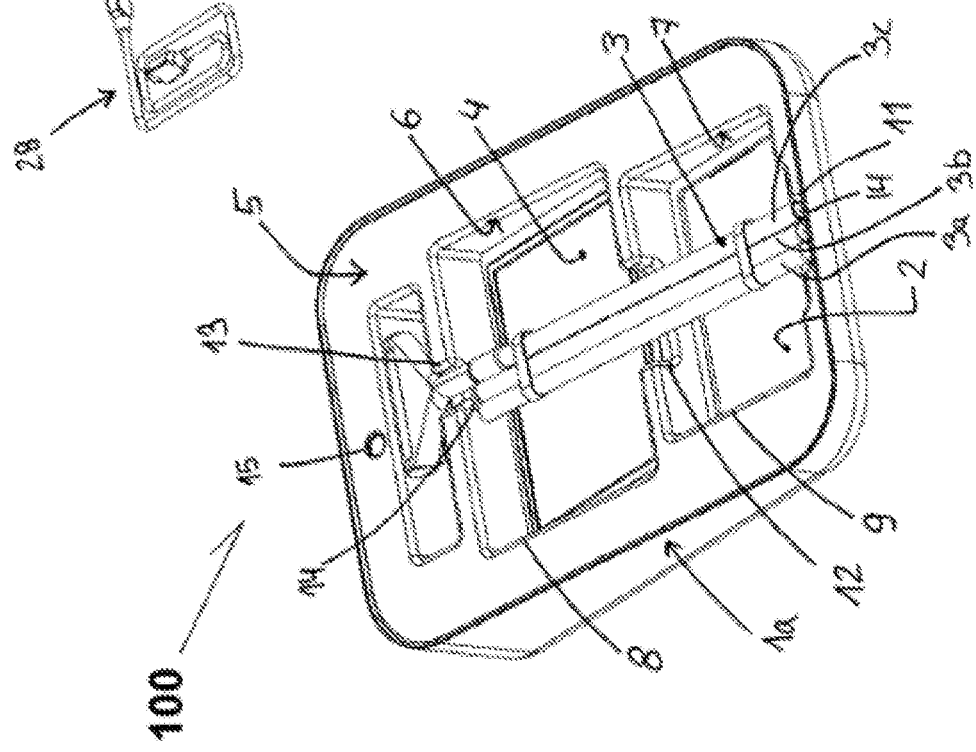
Figure 2:
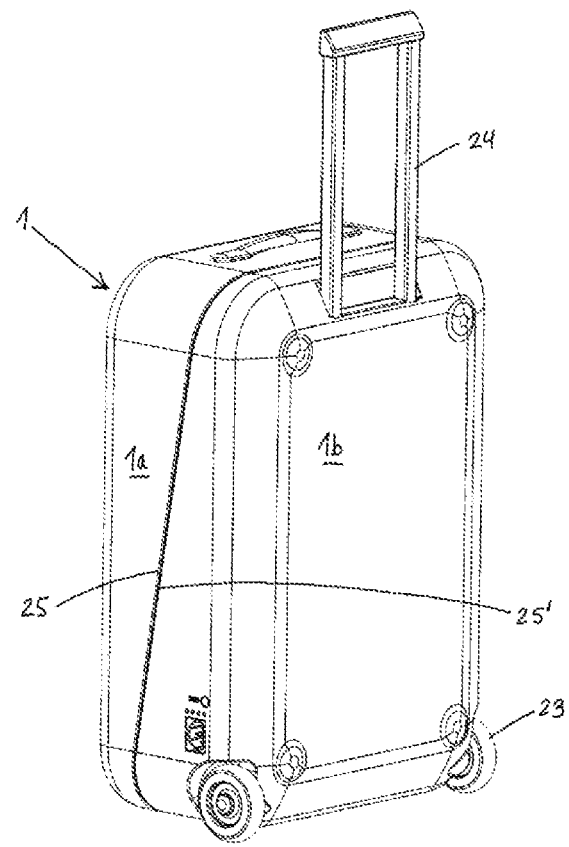
FIG. 2 illustrates the teleprompter system of FIG. 1, with the two parts of the suitcase coupled together.

The teleprompter system 100 illustrated by way of example in FIG. 1 comprises two parts 1a, 1b that may be coupled together to form a suitcase 1 (see FIG. 2). Each one of the parts 1a, 1b integrates a display 4,4' and serves as a repository for one or two reflective sheets 2, 2' and for an associated pole 3, 3', furthermore being fit to serve as a support for said pole 3, 3' in an erect position, as is explained in detail further on.

The two parts 1a and 1b couple together such that the assembly looks like a normal travel suitcase 1, which in the embodiment shown in FIG. 2 is provided with two wheels 23 to roll it along the ground and with an extending handle 24. The teleprompter system 100 weighs approximately ten kilograms and, with its handle 24 folded in, the dimensions of the suitcase make it possible to carry it on board when traveling with most of the world's airlines.

FIG. 1 shows how the parts 1a and 1b are essentially symmetrical and how the two parts 1a, 1b of the suitcase define a mutual coupling plane 25, 25' that is inclined. Advantageously, in each part 1a, 1b of the suitcase 1 one may distinguish a deeper area in which the corresponding display 4, 4' is secured, and a shallower area fit to house one or two superimposed reflective sheets 2, 2'.

Each part 1a and 1b is fit to be arranged in a stable manner on a floor, offering an upwards-facing operating face 5, 5', as illustrated in FIG. 1, which is provided with means 6, 6' to firmly support the corresponding display 4, 4'; and pole 3, 3 anchoring means 7, 7', each operating face 5, 5' being further equipped with a series of housings designed to house the reflective sheets 2, 2' and the associated poles 3, 3', said housings serving as a repository for these components while the system is being carried inside the suitcase 1.

Thus, as for the means 6, 6' for firmly supporting the display 4, 4', they are formed by a window or a recess 8, 8' made in the operating face 5, 5' of the corresponding part of the suitcase, in which the display 4, 4' is secured or integrated.

The arrangement of the pole 3, 3' anchoring means 7, 7' in the parts 1a and 1b of the suitcase 1 guarantees correct and simple installation of the system, insofar as the erect pole 3, 3' will necessarily be coupled to the part 1a or 1b of the suitcase 1 in a position that guarantees that the associated reflective sheet 2, 2' to be supported by said pole 3, 3' will be able to reflect the content shown on the display 4 or 4'.

Notice that the inclination of the coupling plane 25, 25' in the parts 1a and 1b of the suitcase 1 makes it possible to give each part 1a and 1b a high enough wall to hide the contents of the corresponding part of the suitcase from the public, and in particular the display 4, 4' secured in each part 1a and 1b of the suitcase Moreover, it also guarantees that each part 1a and 1b of the suitcase 1 has enough space to house first motorized means 16 fit to transmit a rotational movement to said pole 3 or 3' around its longitudinal axis.

Figure 3:
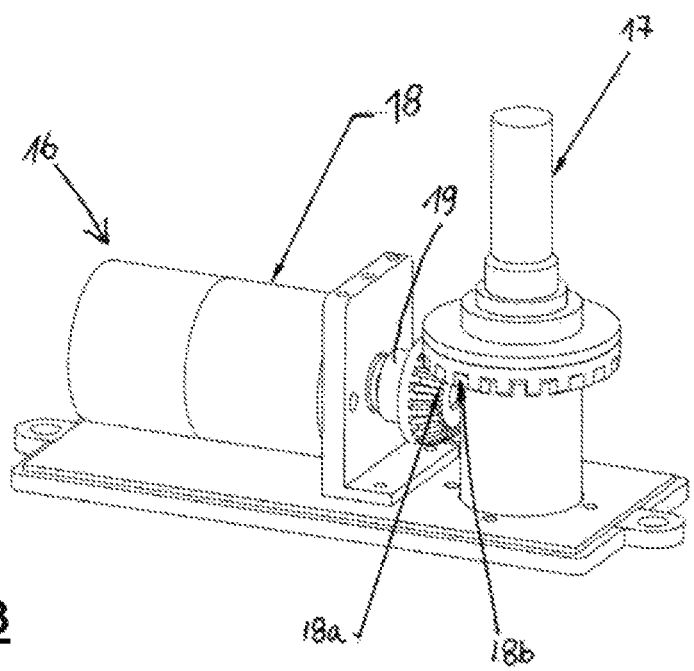
FIG. 3 shows a schematic representation of an example of the first motorized means, which give the teleprompter system the ability of being able to regulate the poles.

Indeed, the pole 3, 3' anchoring means 7, 7' comprise, in the deeper area in each part 1a and 1b of the suitcase 1, a hole 15, 15' in the operating face 5, 5' into which the bottom end of the pole is inserted. In turn, the motorized means 16 comprise a socket 17 mounted so as to rotate in the corresponding part of the suitcase and with suitable dimensions for the bottom end of the pole 3, 3' to be inserted therein, a motor 18 with an output shaft 19 normal to the axis of the socket 17, and gears 18a, 18b for transmitting the rotational movement of the motor shaft to the socket, all of this as illustrated in FIG. 3. In the example, the motor incorporates a 392:1 reduction gear at the output of the motor 18, and the gears 18a, 18b comprise 90-degree coupling of a meshed pair with a 2:1 ratio. The rotational output movement is regulated with the voltage of the power supply of the motor, with a nominal value of 2.5 revolutions per minute. This movement is controlled by a circuit board housed in the same part 1a or 1b of the suitcase 1.

The poles 3, 3' are made of aluminum and are folding. In the example, each pole 3, 3' comprises various sections 3a to 3c; and 3a' to 3c' concatenated together by means of elastic means 14 that respond to stress, such that they tend to arrange the coupled sections in a line, thus forming a rigid rod, but which give the pole the ability to fold against itself between every two consecutive sections through the deformation of the elastic means. This special design is akin to that of a blind person's cane.

FIG. 1 also shows how the operating face 5, 5' of the two parts 1a, 1b of the suitcase 1 comprises a first housing 9, 9' whose dimensions allow at least one reflective sheet 2, 2' of the system to fit snugly inside of it, or alternatively two reflective sheets, one on top of the other, should the teleprompter system 100 be provided with two sets of reflective sheets: one with a pair of transparent reflective sheets and another with a pair of reflective sheets with one tinted face making them especially suited to outdoor use. In any case, the reflective sheets are made of acrylic glass, instead of common glass as is typically used, in order to decrease the weight of the teleprompter system 100.

The operating face 5, 5' of the two parts 1a, 1b of the suitcase 1 further comprises a second housing 10, 10' into which a pole 3, 3' of the system is meant to fit snugly when in its folded position.

In the example, this second housing 10, 10' is formed by a series of recesses 11 to 13 and 11' to 13' arranged around the edge of the window or recess 8, 8' and of the first housing 9, 9', such that the pole 3, 3' is placed directly over the display 4, 4' and the reflective sheet 2, 2' while carrying the system inside the suitcase 1.

Naturally, the display 4, 4', the reflective sheet 2, 2' and, where appropriate, the pole 3, 3', are sunken below the coupling plane 25, 25' in each part of the suitcase 1 when the latter acts as a repository.

One end of each pole 3, 3' is equipped with means to detachably couple 20 to a corresponding reflective sheet 2, 2'. Preferably snap coupling is used, and no implement or tool has to be used. In the example, the detachable coupling means 20 comprise a clip-shaped device.

These detachable coupling means 20 are connected to second motorized means 21 that give it the ability to rotate around an axis (x) normal to the pole 3, 3', and therefore to fold down the coupled reflective sheet 2, 2'.

The motorized means may be provided, according to one embodiment, with a motor that, through a small-diameter planetary reduction gear and a coupling, makes it possible to carry out the rotational movement of the reflective sheet around the axis (x). The planetary reduction gear adjusts the speed and torque to the rotation requirements, it being possible to configure this speed within a certain range by means of the voltage of the power supply.

The dual function of the coupling consists of transmitting the torque generated by the motor to the reflective sheet and, should it exceed a set limit, spinning on a friction wheel such that they no longer move together. This makes it possible to manually adjust the position of the reflective sheet without having to uncouple the motor, which is an especially useful function if one does not have a remote control or should the electrical system fail.

The motor is powered through a retractable cord that runs inside the pole 3, 3'.

To aid in reducing the weight, the display 4, 4' is preferably an LCD screen that projects the digital video signal generated by an external device (such as a tablet or personal computer). In the example, the display 4, 4' is based on an "open frame" model, and is to be integrated into the structure of the corresponding part 1a or 1b of the suitcase 1. The display may be selected from between the alternatives on the market having a weight of less than 1 kg, with a digital video input, a mirror function to invert the text received through the video signal, and an approximately ten-inch active area, with less than 25 watts of energy consumption.

As for the reflective sheets 2, 2', in one example they are made of acrylic glass, each weighing less than 100 g and having a size of 21×14.8 cm. The system is preferably equipped with two sets, as mentioned above, wherein the reflective sheets in one of the sets are tinted on one face thereof.

Since both displays 4, 4' have to project the same image from one common video signal provided by an external device, it is provided that one of the parts 1a or 1b of the suitcase 1 shall incorporate a signal splitter device (not shown). As an alternative, this splitter device may be external.

The teleprompter system may be powered through a direct connection to the grid, for example by means of a conventional cord 29, and also autonomously by making use of an internal battery. In this case it is provided that lithium-polymer batteries be used due to the importance of achieving maximum autonomy with minimum weight. The voltage of the internal batteries is preferably 12 volts DC.

Figure 8:
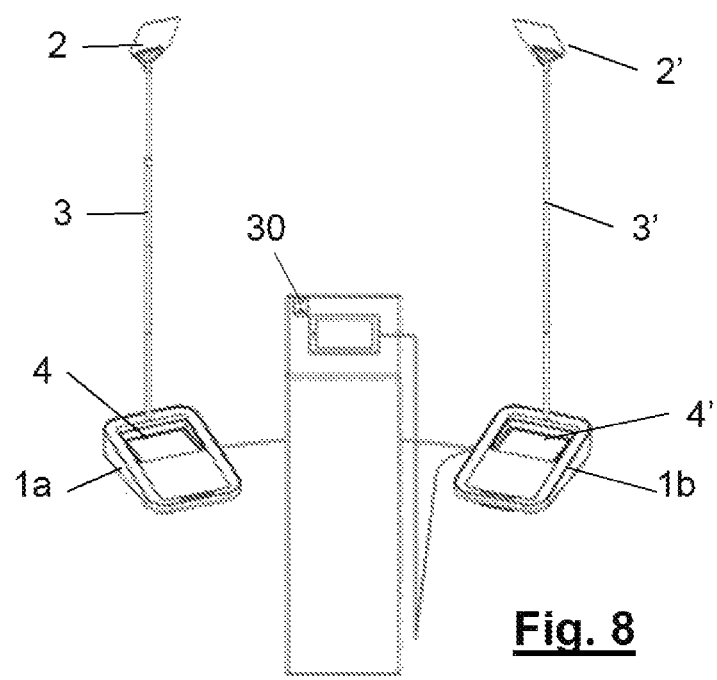
FIG. 8 illustrates the teleprompter system of FIG. 1 when correctly installed.

To instal the invented teleprompter system 100, the speaker, at the place where they will give them speech, need only open up the suitcase 1 and arrange the two parts 1a and 1b thereof on the floor with the operating faces 5, 5' thereof facing upwards, as illustrated in FIGS. 1 and 8, on both sides of, for example, the podium 30. The speaker will only need to connect the two parts 1a or 1b with two cables: one for power supply 26 and another video signal cable 27 that splits the image. This operation may be simplified if the two cables are provided in a single connection tube. Likewise, it will be necessary to take the poles 3, 3' out of the housings 9, 9', and couple the bottom end of each of them into the corresponding hole 15, 15' and then couple on a reflective sheet 2, 2' by snapping it into the top end of each pole 3, 3', as shown in FIG. 8.

Figure 7:
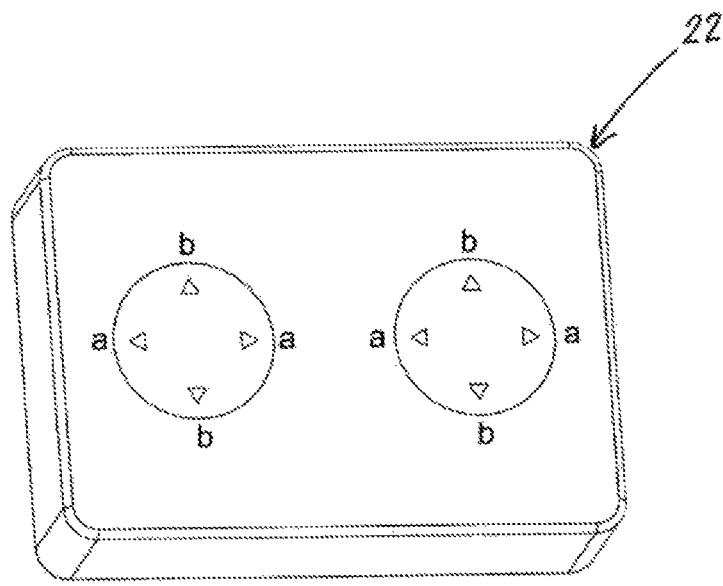
FIG. 7 is an example of a radio remote control to command the motor means incorporated in the teleprompter system.

The invention provides for equipping the teleprompter system 100 with a radio control 22 to command the first and second motorized means 16 and 21. FIG. 7 shows an example of a radio remote control. Given the importance of the stability of the reflective sheets' position during use, the communication between the remote control and each one of the first and second motorized means 16 and 21 is digital, for example on the band 2.4 GHz (license-free band), with a maximum range of 30 meters.

The teleprompter system 100 further comprises a cable 29 to connect one of the two parts 1a, 1b to any external device incorporating the source of the image to be projected.

The invention claimed is:

1. A portable teleprompter system comprising two sets of transparent reflective sheets with respective associated support poles and displays, the system comprises a carry-on-sized suitcase that holds the system components and has two separable parts, each separable part is configured to be arranged in a stable manner on a floor, offering an upwards-facing operating face that is provided with at least
    means to firmly support a corresponding one of the displays;

means for anchoring a corresponding one of the poles in such a position that the reflective sheet supported by said corresponding one of the poles can reflect content shown on the display.

2. The teleprompter system according to claim 1, wherein the means for firmly supporting the display are formed by a window or a recess made in the operating face of the corresponding part of the suitcase, in which the display is secured.

3. The teleprompter system according to claim 1, wherein the operating faces of the parts of the suitcase are equipped with a series of housings designed to house the reflective sheets and the associated poles, said housings serving as a repository for the reflective sheets and the associated poles while the system is being carried inside the suitcase.

4. The teleprompter system according to claim 3, wherein the operating face of each of the two parts of the suitcase comprises a first housing whose dimensions allow at least one reflective sheet of the system to fit snugly inside the first housing.

5. The teleprompter system according to claim 3, wherein the operating face of each of the two parts of the suitcase further comprises a second housing into which a pole of the system is meant to fit snugly when in a folded position.

6. The teleprompter system according to claim 5, wherein the second housing is formed by a series of recesses arranged at an edge of the window or recess and of the first housing, such that the pole is placed directly over the display and the reflective sheet while carrying the system inside the suitcase.

7. The teleprompter system according to claim 2, wherein the two parts of the suitcase define a mutual coupling plane, and the display, the reflective sheet and, where appropriate, the pole, are sunken below the coupling plane in each part of the suitcase when the latter acts as a repository.

8. The teleprompter system according to claim 7, wherein the coupling plane is an inclined plane, there thus being in each part of the suitcase a deeper area in which the display is located, and a shallower area fit to house the reflective sheets.

9. The teleprompter system according to claim 1, wherein the poles are foldable.

10. The teleprompter system according to claim 9, wherein the poles comprise various sections elastically concatenated together, such that the various sections tend to arrange the coupled sections in a line, thus forming a rigid rod, but which give the pole the ability to fold against itself between every two consecutive sections.

11. The teleprompter system according to claim 1, wherein the means for anchoring comprise a hole in the operating face of each part of the suitcase, into which a bottom end of the pole is inserted.

12. The teleprompter system according to claim 11, wherein the means for anchoring further comprise motorized means fit to transmit a rotational movement to said pole around longitudinal axis of the pole.

13. The teleprompter system according to claim 12, wherein the motorized means comprise a socket mounted so as to rotate in the corresponding part of the suitcase and with suitable dimensions for the bottom end of the pole to be inserted therein, a motor with an output shaft normal to the axis of the socket, and gears for transmitting the rotational movement of the motor shaft to the socket.

14. The teleprompter system according to claim 8, wherein the motorized means are arranged in the deeper area of each part of the suitcase.

15. The teleprompter system according to claim 1, wherein one end of each pole is equipped with means to detachably couple to a corresponding reflective sheet.

16. The teleprompter system according to claim 15, wherein the detachable coupling means are connected to second motorized means that give them the ability to rotate around an axis normal to the pole, and therefore to fold down the coupled reflective sheet.

17. The teleprompter system according to claim 12, comprising a remote control to command at least one of the first and second motorized means via radio frequency.

18. The teleprompter system according to claim 1, wherein at least one of the parts of the suitcase is provided with a battery; an electrical inlet; a port for a connector of an external device; and ports for a mutual connector between the parts of the suitcase; the system further comprising a set of connectors with at least
  a power cord between the two parts of the suitcase;
  a video signal cable, or image splitter, between the two parts of the suitcase;
  a cable to connect an external device that is the source of the image to be projected.

19. The teleprompter system according to claim 18, wherein the parts of the suitcase are provided with means to wirelessly transmit a video signal between them; to connect a video cable between the two parts of the suitcase; or both at once.

20. The teleprompter system according to claim 1, wherein the reflective sheets are made of acrylic glass.

21. The teleprompter system according to claim 20, wherein the two sets of reflective sheets comprise a first and a second set of reflective sheets, the reflective sheets of one of the sets being tinted.

22. A portable teleprompter system comprising reflective sheets with respective associated support poles and displays, the system comprises a suitcase that holds the system components and has two separable parts, each separable part is configured to be arranged in a stable manner on a floor and offering an upwards-facing operating face that is provided with a recess to firmly support a corresponding one of the displays and a hole configured to receive an end of a corresponding one of the support poles in such a position that the respective transparent reflective sheet when supported by the pole reflects content shown on the display.

* * * * *